Sept. 14, 1943.  G. E. REED  2,329,419
EQUIPPED VEHICLE
Filed Dec. 9, 1940
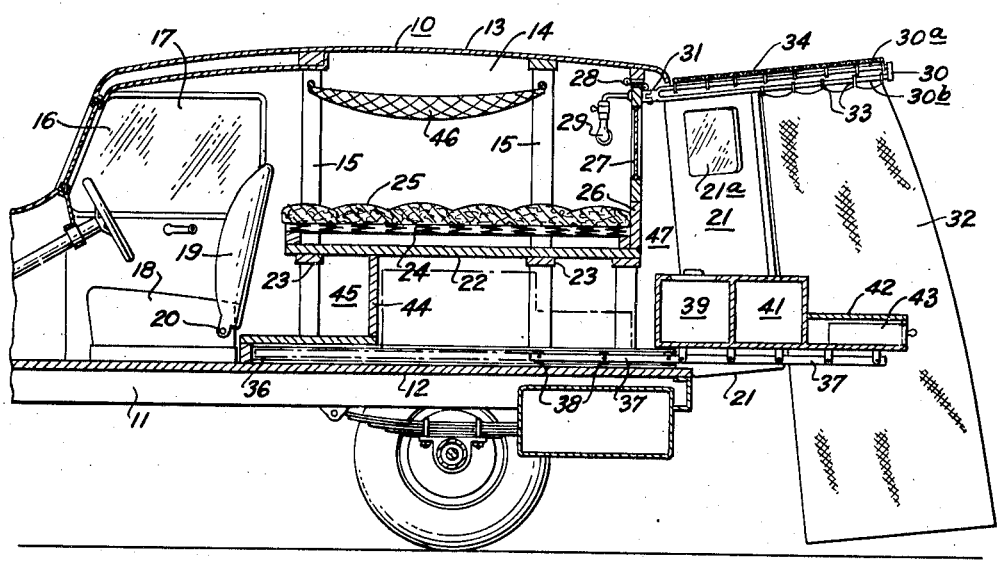
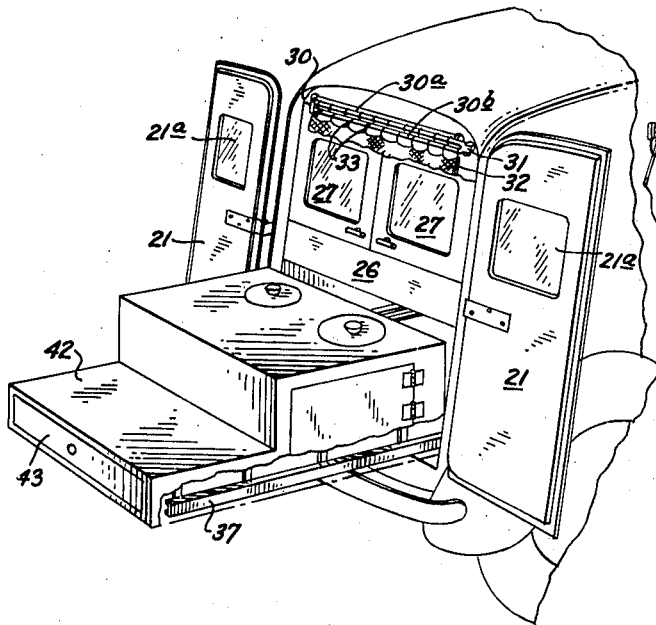 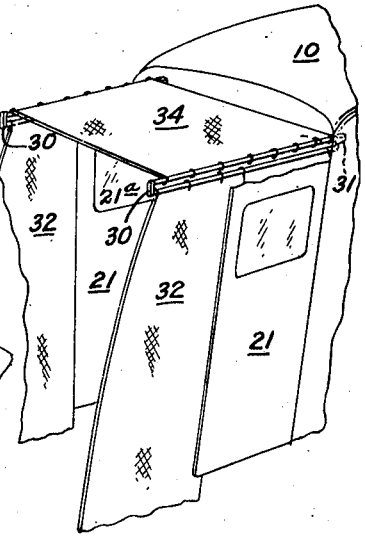
INVENTOR.
GEORGE E. REED
BY
ATTORNEY.

Patented Sept. 14, 1943

2,329,419

UNITED STATES PATENT OFFICE 2,329,419

EQUIPPED VEHICLE

George E. Reed, Oakland, Calif.

Application December 9, 1940, Serial No. 369,160

10 Claims. (Cl. 296—23)

This invention relates to equipped vehicles, and more particularly to vehicles which are equipped for camping and hunting trips or other analogous uses where it is desired to have both sleeping and cooking facilities in connection with a vehicle trip.

The most usual form of transportation at the present time being by motor-driven vehicle, the disclosure of the invention herein is made with relation to an automobile vehicle having a truck type of enclosed body.

Among the objects of the invention are to provide a standardized vehicle which serves for transportation, sleeping accommodations while in transit as well as while stationary, and cooking accommodations including shelter therefor when at stopping places. A further object is to provide a camping or cruising vehicle in which auxiliary cooking accommodations are slidable into the vehicle body during transit, but which may be supported at an outwardly extended position at any time when it is desired to use such cooking facilities at a destination or stopping place. A further object is to provide in a vehicle so equipped, a readily opened and closable curtain as a weather shield.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawing wherein:

Fig. 1 is a longitudinal vertical section of rear portion of the vehicle.

Fig. 2 is a vertical perspective of rear end of the vehicle.

Fig. 3 is a perspective view of rear portion of the vehicle with curtains in extended position.

Referring to the several views of the drawing, in which like reference characters indicate corresponding parts, 10 indicates generally a standard enclosed vehicle body mounted on a chassis 11, comprising the usual supporting frame, springs and wheels. On the chassis is mounted a floor 12 and an enclosed superstructure comprising a top 13 and side walls 14, the top and sides having suitable braces or supports 15. At the forward portion of the enclosed body 10 is a driver's compartment 16 having entrance-exit doors 17 and driver's seat 18, the latter preferably having its back-rest 19 hinged at 20 so as to be tiltable forwardly. The usual well-known positioning of the seat relative to the door may be conveniently employed so that when the door is open and the back rest 19 is tilted forwardly the space to the rear of the seat is accessible to the door when the door is opened. The rear end of the body 10 is closable, preferably by a pair of doors 21 hingedly mounted vertically in a well-known manner, though, if desired, a single door may be employed substantially of the width of the opening at the rear end of the body. Such doors of either type are well-known and it is not believed necessary to describe them in further detail, other than to say that they may be swung on hinges to selectively open or close the rear end of the vehicle.

Intermediate the floor 12 and top 13 and transversely of the body is a suitable supporting means or platform 22 which extends longitudinally from adjacent the backrest 19 to substantially the opposite end of the vehicle body, preferably terminating in relatively short spaced relationship to the rear doors 21 when they are in closed position. Platform 22 is supported by thwarts or cross pieces 23 which are supported at their respective opposite ends on the vehicle body braces 15. It is to be understood that the support or platform 22 is not necessarily a solid plane, but may be slatted, or may comprise merely a series of transverse thwarts. The platform 22 serves to divide the vertical height of the body 10 into an upper compartment and a lower compartment. In the upper compartment, resting on the supporting means 22, is a bed comprising springs 24 upon which rests a mattress 25.

It is preferred to provide an interior transverse panel 26 at the rear end portion of the upper compartment so that the bed may be shielded from inclement weather conditions when doors 21 are open. The panel 26 may, if desired, be provided with a transparent sight window 27 in line with the sight windows of the rear doors 21 so that the panel 26 does not obscure the driver's vision to the rear of the vehicle. The panel 26 may be hingedly mounted at its upper edge on a hinge 28 so that upon proper occasion it may be swung either outwardly or inwardly to provide ventilation for the upper compartment, any suitable well-known means being employed for maintaining it at either an outward or inward position, such as an ordinary strap-hinge of the type employed to hold up the lid of a trunk. The panel 26 may, if desired, carry auxiliary conveniences such as an electric light 29 or electric clock, radio or the like, these being merely selective illustrative accessories. It is preferred that panel 26 be slightly spaced from the rear door substantially in the same vertical plane as the rearward end of the mattress and springs 24, 25.

At the upper rear end of the vehicle body there is mounted a curtain bar structure 30 which has pivotal mounting at 31 and preferably is bifurcated providing two substantially parallel arms, 30$^a$ and 30$^b$, on the lower of which, 30$^b$, drop curtains 32 may be slidably mounted by means of curtain rings 33. On the upper arm 30$^a$ may likewise be mounted a top cover curtain 34. It is contemplated that there will be one of these bifurcated bar elements at each side of the vehicle, one having its pivotal mounting slightly offset inwardly from the other so that the respective bars 30 may be folded inwardly relative to the vehicle body and overlie each other in close proximity transversely within the rear end of the vehicle body and permit the rear doors 21 to be closed thereover. The cover curtain 34 is attached to the upper bar 30$^a$ of each bar assembly so that when the bars are swung outwardly the cover curtain automatically unfolds and stretches itself into an extended covering at the rear end of the vehicle; the side curtains are relatively separate, one being suspended on the lower bar 30$^b$ on each of the bar assemblies so that there is an extended depending curtain at each side of the vehicle body co-operating with the cover curtain to provide an open shielded space rearwardly of the vehicle. When the two bars 30 are folded inwardly and the rear doors 21 are in closed position, the top curtain 34 and side curtains 32 may be folded and pushed through the panel 26 by swinging the latter inwardly; and thus repose upon the mattress 25 and be completely out of the way, care being taken to push them to one side on their supporting rings so as not to obscure the rear view of the driver through the sight glass 21$^a$ of the rear door.

At the rear of the vehicle, in the lower compartment adjacent the floor, means are provided for reciprocally supporting suitable auxiliary equipment which may be necessary, or desirable for use on trips such as camping, hunting, engineering surveys, and the like. In the present exemplification, such reciprocal means comprises a track mounted upon the floor 12 and in this instance consists of two opposingly spaced strips of channel iron 36 longitudinally of the vehicle body and which are mounted so as to rest on one of the side walls of the channel so that the grooves or channels are relatively opposed longitudinally of the vehicle body. Mounted in sliding relationship within the opposed grooves or channels is a slide member frame 37, the sliding of which, with relation to the channels of the channel iron, may be facilitated by anti-friction rollers 38. Upon the extendable rearward end of frame 37 may be mounted any suitable assembly of accessories, those mentioned herein being merely illustrative examples and designated refrigerator 39, a compartment 41 for dishes and pans, a table 42 having a drawer 43. Like accessories, such as a stove, oven, wash basin, etc., are suggested as other suitable facilities which may be employed alternatively or additionally. The accessories are fixedly secured to the rear extendable end of frame 37 by any suitable means conventionally illustrated as bracket 37a so that the accessories slide in and out in unison with the frame 37, and are fixedly secured against inadvertent movement both when they are reciprocated inwardly and outwardly and also in transit when they are at inward position upon the frame within the vehicle body. As shown in dotted lines of Fig. 1, the frame 37 may slide inwardly into the lower compartment of the vehicle body on the tracks 36, the length of the auxiliary unit comprising the facilities 39, 41, 42, 43, being dimensioned to fit within said lower compartment so that the rear doors may be snugly closed, which is their normal position while the vehicle is in transit. Usually, the number, type and size of such auxiliary equipment can be accommodated on the slidable frame 37 without completely exhausting the space in the lower body compartment. It is therefore desirable to provide a transverse closing panel 44 adjacent the forward end of the lower compartment and thus segregate a separate compartment which may be employed for storage of clothes, boxes of food, and the like. It will be noted that the reciprocable frame 37 is of greater length than the auxiliary facilities which are mounted at the outer end thereof, thus providing an inner portion of said frame to remain as a support within the channel of the track 36 when the auxiliary facilities are extended into outward, usable position. Therefore, when the said facilities are pushed to their closed position, indicated in dotted lines in Fig. 1, space must be provided to accommodate the extending inner end of the frame 37. This latter necessity may be accommodated by stepping the lower shelf of the forward compartment 45 from the floor 12 so that the channel irons 36 may extend beneath said auxiliary compartment 45, and thus also provide an elevated step rearwardly of seat 19 whereby entry and exit to the upper sleeping compartment may be facilitated when the backrest 18 of the seat is tilted forwardly. Other suitable facilities may also be provided, such as a clothes hammock 46 suspended in the upper compartment upon suitable hooks on the upright supports 15.

While it is not an essential feature, it is preferred that there be a relatively narrow vertical space indicated 47 between the rear end of the upper and lower compartments and the doors 21 when the latter are closed, so as to provide a vertical chamber of relatively large surface area and shallow depth in which the curtains 32, 34 may be folded in case they are wet from inclement weather when it would not be advisable to put them upon the bed in the upper compartment; or upon occasion it may be desirable to employ the bed for sleeping accommodations while the curtains are folded and the door is closed, such as when a long, continuous trip is being made, and the parties on the trip take turns in alternatively driving and sleeping.

Having thus described my invention, I claim:

1. In a vehicle having a chassis, a body mounted on the chassis and having a top and floor, said body having an outwardly opening vertically hinged rear door provided with a rear sight window, a transverse platform longitudinally within said body intermediate the top and floor providing an upper compartment and a lower compartment, said upper compartment having a rear closure member independent of said rear door and having a sight window therein in overlying alignment with the sight window of the rear door when the rear door is closed, and reciprocably mounted support means at the lower part of the lower compartment for mounting thereon of suitable auxiliary equipment, said support means being adapted to normally lie within the lower compartment of the vehicle body and being selectively extendible rearwardly beyond the confines of the vehicle body, said support means being of such length that when the auxiliary equipment thereon is in extended position beyond the confines of the vehicle body, there is an additional length of the support means engaged within the vehicle body to support the extended portion and the equipment thereon.

2. In a vehicle having a chassis, a body mounted on the chassis and having a top and floor and having at its forward portion a driver's compartment with a transverse seat having a hinged backrest foldable forwardly, said body having an outwardly opening vertically hinged rear door, a transverse platform longitudinally within said body intermediate the top and floor providing an upper compartment and a lower compartment, said upper compartment having a rear closure member independent of said rear door, reciprocably mounted support means at the lower part of the lower compartment for mounting thereon of suitable auxiliary equipment, said support means being adapted to normally lie within the lower compartment of the vehicle body and being selectively extendible rearwardly beyond the confines of the vehicle body, and a panel transversely mounted adjacent the forward end of the lower compartment providing a lower sub-compartment spaced from the floor to receive thereunder the forward end of the reciprocable support means, said sub-compartment being accessible by forwardly tilting the hinged backrest of the transverse seat of the driver's compartment, said support means being of such length that when the auxiliary equipment thereon is in extended position beyond the confines of the vehicle body, there is an additional length of the support means engaged within the vehicle body to support the extended portion and the equipment thereon.

3. In a vehicle having a chassis, a body mounted on the chassis and having a top and floor, said body having an outwardly opening vertically hinged rear door provided with a rear sight window, a transverse platform longitudinally within said body intermediate the top and floor providing an upper compartment and a lower compartment, said upper compartment having a rear closure member independent of said rear door and hingedly mounted to swing both inwardly and outwardly, said closure having a transparent sight window in overlying alignment with the sight window of the door when the rear door is closed, a longitudinal track in the lower compartment adjacent the floor, and a slide member support means longitudinally slidable on said track and adapted for supporting suitable auxiliary equipment, said support means being of such length that when the auxiliary equipment thereon is in extended position beyond the confines of the vehicle body, there is an additional length of the support means engaged within the vehicle body to support the extended portion and the equipment thereon.

4. In a vehicle having a chassis, a body mounted on the chassis and having a top and floor, said body having an outwardly opening vertically hinged rear door provided with a rear sight window, a transverse platform longitudinally within said body intermediate the top and floor providing an upper compartment and a lower compartment, said upper compartment having a rear closure member independent of said rear door and hingedly mounted to swing both inwardly and outwardly, said closure having a transparent sight window in overlying alignment with the sight window of the door when the rear door is closed, reciprocably mounted support means at the lower part of the lower compartment for mounting thereon of suitable auxiliary equipment, said support means being adapted to normally lie within the lower compartment of the vehicle body and being selectively extendible rearwardly beyond the confines of the vehicle body, and a bar unit comprising a pair of substantially parallel bar members, one of said units being pivotally mounted at the upper rear portion of each side of said vehicle body and disposed in overlying relation transversely of and substantially parallel to the floor of the vehicle body and adapted for swinging outwardly for supporting curtains thereon, said support means being of such length that when the auxiliary equipment thereon is in extended position beyond the confines of the vehicle body, there is an additional length of the support means engaged within the vehicle body to support the extended portion and the equipment thereon.

5. In a vehicle having a chassis, a body mounted on the chassis and having a top and floor and having at its forward portion a driver's compartment with a transverse seat having a hinged backrest foldable forwardly, said body having an outwardly opening vertically hinged rear door, a transverse platform including a bed spring longitudinally within said body intermediate the top and floor providing an upper compartment and a lower compartment, said upper compartment having a rear closure member independent of said rear door, reciprocably mounted support means at the lower part of the lower compartment for mounting thereon of suitable auxiliary equipment, said support means being adapted to normally lie within the lower compartment of the vehicle body and being selectively extendible rearwardly beyond the confines of the vehicle body, a panel transversely mounted adjacent the forward end of the lower compartment providing a lower sub-compartment spaced from the floor to receive thereunder the forward end of the reciprocable support means, said sub-compartment being accessible by forwardly tilting the hinged backrest of the transverse seat of the driver's compartment, and a bar pivotally mounted at the upper rear portion of said vehicle body and adapted for swinging outwardly for supporting curtains thereon, said support means being of such length that when the auxiliary equipment thereon is in extended position beyond the confines of the vehicle body, there is an additional length of the support means engaged within the vehicle body to support the extended portion and the equipment thereon.

6. In a vehicle having a chassis, a body mounted on the chassis having closed sides, a top and floor, said body having an outwardly opening vertically hinged rear door provided with a rear sight window, a transverse platform longitudinally within said body intermediate the top and floor and adapted for supporting a bed thereon, said platform dividing the interior of said body into an upper and a lower compartment, the upper of said compartment having a rear closure independent of the rear door and provided with a sight opening in overlying alignment with the sight window of the rear door when the rear door is closed, and a reciprocably mounted support means at the lower part of the lower compartment for mounting thereon of suitable auxiliary equipment, said support means being adapted to normally lie within the lower compartment of the vehicle body and being selectively extendible rearwardly beyond the confines of the vehicle body, said support means being of such length that when the auxiliary equipment thereon is in extended position beyond the confines of the vehicle body, there is an additional length of the support means engaged within the vehicle body to support the extended portion and the equipment thereon.

7. In a vehicle having a chassis, a body mounted on the chassis and having a top and floor, said body having an outwardly opening vertically hinged rear door provided with a rear sight window, a transverse platform longitudinally within said body intermediate the top and floor providing an upper compartment and a lower compartment, said upper compartment having a rear closure member independent of said rear door and having a sight window therein in overlying alignment with the sight window of the rear door when the rear door is closed, a longitudinal track in the lower compartment adjacent the floor, a slide member support means longitudinally slidable on said track and adapted for supporting suitable auxiliary equipment, and a bar pivotally mounted at the upper rear portion of each side of said vehicle body and disposed in overlying relation transversely of and substantially parallel to the floor of the vehicle body and adapted for swinging outwardly for supporting curtains thereon, said support means being of such length that when the auxiliary equipment thereon is in extended position beyond the confines of the vehicle body, there is an additional length of the support means engaged within the vehicle body to support the extended portion and the equipment thereon.

8. In a vehicle having a chassis, a body mounted on the chassis and having a top and floor, and having at its forward portion a driver's compartment with a transverse seat having a hinged backrest foldable forwardly, said body having an outwardly opening vertically hinged rear door, a transverse platform including a bed spring longitudinally within said body intermediate the top and floor providing an upper compartment and a lower compartment, said upper compartment having a rear closure member independent of said rear door, a longitudinal track in the lower compartment adjacent the floor, a slide member support means longitudinally slidable on said track and adapted for supporting suitable auxiliary equipment, and a panel transversely mounted adjacent the forward end of the lower compartment providing a lower sub-compartment spaced from the floor to receive thereunder the forward end of the reciprocable support means, said sub-compartment being accessible by forwardly tilting the hinged backrest of the transverse seat of the driver's compartment, said support means being of such length that when the auxiliary equipment thereon is in extended position beyond the confines of the vehicle body, there is an additional length of the support means engaged within the vehicle body to support the extended portion and the equipment thereon.

9. In a vehicle having a chassis, a body mounted on the chassis and having a top and floor, said body having an outwardly opening vertically hinged rear door provided with a rear sight window, a transverse platform longitudinally within said body intermediate the top and floor providing an upper compartment and a lower compartment, said upper compartment having a rear closure member independent of said rear door and having a sight window therein in overlying alignment with the sight window of the rear door when the rear door is closed, a longitudinal track in the lower compartment adjacent the floor, a slide member support means longitudinally slidable on said track and adapted for supporting suitable auxiliary equipment, one end portion of said slide member being adapted for sliding rearwardly outward beyond the chassis frame, while the opposite end portion of the slide member engages the track to support the rearwardly extended portion, and a bar pivotally mounted at the upper rear portion of each side of said vehicle body and disposed in overlying relation transversely of and substantially parallel to the floor of the vehicle body and adapted for swinging outwardly for supporting curtains thereon, said support means being of such length that when the auxiliary equipment thereon is in extended position beyond the confines of the vehicle body, there is an additional length of the support means engaged within the vehicle body to support the extended portion and the equipment thereon.

10. In a vehicle having a chassis, a body mounted on the chassis and having a top and floor and having at its forward portion a driver's compartment with a transverse seat having a hinged backrest foldable forwardly, said body having an outwardly opening vertically hinged rear door provided with a rear sight window, a transverse platform longitudinally within said body intermediate the top and floor providing an upper compartment and a lower compartment, said upper compartment having a rear closure member independent of said rear door and having a sight window therein in overlying alignment with the sight window of the rear door when the rear door is closed, a longitudinal track in the lower compartment adjacent the floor, a slide member support means longitudinally slidable on said track and adapted for supporting suitable auxiliary equipment, one end portion of said slide member being adapted for sliding rearwardly outward beyond the chassis frame, while the opposite end portion of the slide member engages the track to support the rearwardly extended portion, a panel transversely mounted adjacent the forward end of the lower compartment providing a lower sub-compartment spaced from the floor to receive thereunder the forward end of the reciprocable support means, said sub-compartment being accessible by forwardly tilting the hinged backrest of the transverse seat of the driver's compartment, and a bar comprising relatively spaced substantially parallel members pivotally mounted at the upper rear portion of each side of said vehicle body and disposed in overlying relation transversely of and substantially parallel to the floor of the vehicle body and adapted for swinging outwardly for supporting curtains thereon, said support means being of such length that when the auxiliary equipment thereon is in extended position beyond the confines of the vehicle body, there is an additional length of the support means engaged within the vehicle body to support the extended portion and the equipment thereon.

GEORGE E. REED.